United States Patent
Hiro et al.

(10) Patent No.: US 6,192,694 B1
(45) Date of Patent: Feb. 27, 2001

(54) ABSORPTION TYPE REFRIGERATING MACHINE

(75) Inventors: Naoki Hiro; Yasuharu Kurogi; Tadato Fujihara; Yoshio Ozawa; Toshihiro Yamada, all of Moriguchi (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/381,909

(22) PCT Filed: Jan. 27, 1999

(86) PCT No.: PCT/JP99/00350

§ 371 Date: Sep. 27, 1999

§ 102(e) Date: Sep. 27, 1999

(87) PCT Pub. No.: WO99/39140

PCT Pub. Date: Aug. 5, 1999

(30) Foreign Application Priority Data

Jan. 29, 1998 (JP) .................................. 10-016523
Feb. 18, 1998 (JP) .................................. 10-036038
Feb. 18, 1998 (JP) .................................. 10-036039
Feb. 18, 1998 (JP) .................................. 10-036040

(51) Int. Cl.[7] ........................................ F25B 15/00
(52) U.S. Cl. ......................... 62/141; 62/497; 62/476
(58) Field of Search .......................... 62/141, 497, 476

(56) References Cited

U.S. PATENT DOCUMENTS

| | | | |
|---|---|---|---|
| 3,604,216 | * 9/1971 | Porter | 62/141 |
| 4,388,812 | * 6/1983 | Clark | 62/141 |
| 4,691,525 | * 9/1987 | Gelderloos | 62/101 |
| 5,224,352 | * 7/1993 | Arima et al. | 62/141 |
| 5,551,254 | * 9/1996 | Inoue | 62/489 |
| 5,586,447 | * 12/1996 | Sibik et al. | 62/141 |
| 5,617,733 | * 4/1997 | Tomita et al. | 62/324.2 |
| 5,813,241 | * 9/1998 | Sibik et al. | 62/148 |

FOREIGN PATENT DOCUMENTS

| | | |
|---|---|---|
| 49-16948 | 2/1974 | (JP) . |
| 54-53340 | 4/1979 | (JP) . |
| 58-184464 | 10/1983 | (JP) . |
| 59-21957 | 2/1984 | (JP) . |
| 7-280384 | 10/1995 | (JP) . |
| 9-61000 | 3/1997 | (JP) . |
| 10-9707 | 1/1998 | (JP) . |

* cited by examiner

Primary Examiner—William Doerrler
Assistant Examiner—Mark Shulman
(74) Attorney, Agent, or Firm—Armstrong, Westerman, Hattori, McLeland & Naughton

(57) ABSTRACT

In a double-effect absorption chiller wherein the vapor of a refrigerant produced by a high temperature generator is supplied to a low temperature generator 12 for condensation, and the refrigerant liquified by condensation is supplied to a condenser 11, a pipe 7 for supplying the refrigerant liquified in the low temperature generator 12 to the condenser 11 therethrough is provided with an orifice 71 and a control valve 81 as pressure adjusting means. A control circuit 9 is connected to the control valve 81 to hold the valve 81 fully open during the period form the start-up of the chiller until the load is stabilized and thereafter gradually decrease the opening degree of the valve 81. Alternatively, a control valve 118 is mounted on the pipe 7 for controlling the pressure of the refrigerant so that the concentration of the absorbent (intermediate solution) in the high temperature generator because equal to the average of the concentration of the absorbent (strong solution) in the low temperature generator 12 and the concentration of the absorbent (weak solution) in an absorber.

14 Claims, 13 Drawing Sheets

ABSORPTION TYPE REFRIGERATING MACHINE

TECHNICAL FIELD

The present invention relates to double-effect absorption chillers wherein the vapor of a refrigerant produced by a high temperature generator is supplied to a low temperature generator for condensation, and the refrigerant liquefied on condensation is supplied to a condenser.

BACKGROUND ART

FIG. 12 shows a double-effect absorption chiller which comprises an upper shell 1 comprising a condenser 11 and low temperature generator 12, a lower shell 2 comprising an evaporator 21 and absorber 22, a high temperature generator 3 incorporating a burner 31, a high temperature heat exchanger 4, a low temperature heat exchanger 5, etc. These components are interconnected by piping to recycle an absorbent through the high temperature generator 3, low temperature generator 12 and absorber 22 by an absorbent pump 6 and realize refrigeration cycles.

With the chiller of the type described, a pipe 7 for supplying the refrigerant liquefied by the low temperature generator 12 to the condenser 11 therethrough is provided with an orifice 70 as shown in FIG. 13 to reduce the pressure of the refrigerant liquefied by the generator 12 before the refrigerant is supplied to the condenser 11. Thus, the generator 12 is maintained at a low internal pressure so that the vapor of refrigerant produced in the generator 12 is liquefied on condensation in the condenser 11.

On the other hand, the high temperature generator 3 produces vapor of refrigerant, which is condensed in a heat transfer tube within the low temperature generator 12 to liquefy while giving the heat of condensation to the absorber. The liquefied refrigerant is supplied to the condenser 11 via the orifice 70 and then returned to the evaporator 21 along with the portion of refrigerant which is liquefied in the condenser 11.

As shown in FIG. 12, a gas valve 32 is mounted on a pipe for supplying a fuel gas to the burner 31 of the high temperature generator 3. The opening degree of the gas valve 32 is controlled to adjust the rate of supply of the fuel gas in order to maintain the temperature cold water outlet temperature Tc_out) of cold water flowing out of the evaporator 21 at a target value.

With the double-effect absorption chiller, it is ideal that the heat input to the high temperature generator 3 cause the generator 3 to produce an amount of vapor corresponding to the quantity of heat input for the amount of vapor to produce vapor having the same quantity of heat in the low temperature generator 12. A maximum efficiency is achieved at this time. To obtain a state as close as to the ideal, it is necessary to optimize the diameter of the orifice 70 to effect a suitable pressure reduction. The optimum pressure reduction varies with the magnitude of the refrigeration load.

Since there is an approximate proportional relationship between the amount of vapor released from the absorbent and the absorbent concentration difference between the inlet and the outlet of the low temperature generator 12 and the high temperature generator 3, an efficiency approximate to a maximum is obtained when the concentration difference between the absorbent (strong solution) in the low temperature generator 12 and the absorbent (intermediate solution) in the high temperature generator 3 is equal to the concentration difference between the absorbent (weak solution) in the absorber 22 and the absorbent (intermediate solution) in the high temperature generator 3.

However, since the conventional double-effect absorption chiller uses a fixed orifice of definite diameter as the orifice 70, the pressure reduction differs from the optimum value with variations in the refrigeration load.

Further when the absorption chiller is started up, the flow rate of refrigerant from the low temperature generator 12 becomes greater than in the state of stabilized load, so that the orifice 70 used has a greater diameter than is optimum in view of the increase in the flow rate. The conventional chiller of the type described therefore has the problem that while the chiller is in operation with a stabilized refrigeration load after the start-up, the pressure reduction becomes insufficient to result in a lower efficiency. The chiller has another problem that when the refrigeration load decreases, impairment of the efficiency becomes pronounced owing to the escape of vapor.

When remaining unchanged in con cent ration, the absorbent evaporates more easily at a lower temperature because of a drop in boiling point. Accordingly, it is possible to adjust the amount of evaporation by controlling the pressure. However, the pipe 7 for supplying the refrigerant liquefied in the low temperature generator 12 to the condenser 11 is merely provided with the orifice 70 of definite diameter, so that the conventional double-effect absorption chiller is not adapted for the active control of pressure. As a result, even if the high temperature generator 3 and the low temperature generator 12 are rated at a ratio of 1:1 in the amount of evaporation when designed, this balance of 1:1 is upset due to variations in the refrigeration load, leading to a lower efficiency.

Further with the chiller of the type described, the absorbent (intermediate solution) in the high temperature generator 3 is supplied to the low temperature generator 12 by virtue of the pressure difference between these generators 3 and 12, whereby the concentration of the absorbent (strong solution) collected in the low temperature generator 12 is determined. Thus, the concentration of the strong solution is not controlled positively. Nevertheless, the lower the concentration of the strong solution, the greater the flow rate of the recycling absorbent is, entailing an increased energy consumption for the rise of sensible heat of the absorbent, hence the problem of impaired efficiency.

An object of the present invention is to provide a double-effect absorption chiller which achieves a higher efficiency than conventionally regardless of the operating conditions such as refrigeration load.

Another object of the invention is to provide an absorption chiller which is adapted to pass the refrigerant to the condenser without stagnation when the chiller is started up or in the event of a sudden increase in the load and which is capable of giving a suitable reduced pressure to the refrigerant during steady-state operation so as to achieve a higher operating efficiency than in the prior art.

Another object of the invention is to positively control the concentration of the strong solution to achieve an improvement in operation efficiency over the prior art.

DISCLOSURE OF THE INVENTION

The present invention provides a first absorption chiller which is characterized in that a pipe 7 for supplying a refrigerant liquefied in a low temperature generator 12 to a condenser 11 therethrough is provided with pressure adjusting means for reducing the pressure of the refrigerant flowing through the pipe and adjusting the pressure reduction, the pressure reduction being adjusted according to the magnitude of the refrigeration load.

Accordingly, an optimum pressure reduction can be set despite the refrigeration load, with the result that each of a high temperature generator 3 and the low temperature generator 12 produces a sufficient amount of vapor in accordance with the quantity of heat input to the generator 3 to realize a higher operation efficiency than in the prior art.

Stated more specifically, the pressure adjusting means comprises an orifice 71 provided in the pipe 7, a bypass pipe 8 bypassing the orifice 71, a control valve 81 provided at an intermediate portion of the bypass pipe 8, and a control circuit 9 for controlling the opening degree of the control valve 81.

With this specific construction, the pressure reduction of the refrigerant passing through the orifice 71 and the control valve 81 is adjusted by adjusting the opening degree of the control valve 81.

Further stated specifically, the quantity of heat input to the high temperature generator 3 is controlled so as to bring a cold water outlet temperature close to a target value, and the control circuit 9 controls the control valve 81 to hold the valve fully open during the period from the start-up of the chiller until the load is stabilized and thereafter gradually decrease the opening degree of the control valve 81 insofar as the quantity of heat input to the high temperature generator 3 decreases.

With this specific construction, the control valve 81 is fully opened on starting up the chiller, whereby the refrigerant flowing out from the low temperature generator 12 can be sent to the condenser 11 without stagnation although the flow rate of the refrigerant increases.

With the load stabilized thereafter, the opening degree of the control valve 81 is gradually decreased to gradually increase the pressure reduction, increasing the difference between the refrigerant saturation temperature in the pipe within the low temperature generator 12 and the solution saturation temperature outside the pipe, so that an increased amount of vapor is produced from the low temperature generator 12. If the quantity of heat input to the high temperature generator 3 is controlled so as to bring the cold water outlet temperature close to the target value, the quantity of heat input will decrease. When the opening degree of the control valve 81 decreases below a certain value, however, the flow rate of the refrigerant decreases, while the heat input increases conversely. Accordingly, upon a change of the heat input from decrease to increase, the adjustment of the opening degree of the control valve 81 is discontinued. Consequently, the valve 81 is set at an optimum opening degree in the state of stabilized load to achieve a higher efficiency than is conventionally attained.

The first absorption chiller embodying the present invention achieves a higher efficiency than in the prior art regardless of the refrigeration load.

The present invention provides a second absorption chiller which is characterized in that a fluid channel for supplying a refrigerant liquefied in a low temperature generator 12 to a condenser 11 therethrough is provided with sensor means for detecting variations in the flow rate of the refrigerant flowing out from the low temperature generator 12, and adjusting means for adjusting the flow rate of the refrigerant to be sent to the condenser 11 and giving a suitable reduced pressure to the refrigerant, the adjusting means being operable to increase the flow rate of the refrigerant upon the sensor means detecting an increased flow rate.

When the flow rate of the refrigerant increases abruptly upon starting up the chiller or in the event of a sudden increase in the load, the increase is detected by the sensor means, and the adjusting means increases the flow rate of the refrigerant to be sent to the condenser 11. This permits the refrigerant flowing out from the low temperature generator 12 to flow into the condenser without stagnation. When the chiller is thereafter brought into steady-state operation with the load stabilized, the refrigerant flows out from the low temperature generator 12 at a constant rate, and a suitable reduced pressure is given to the refrigerant by the adjusting means.

Stated specifically, the sensor means has a refrigerant tank 109 at an intermediate portion of a pipe 7 for supplying the refrigerant liquefied in the low temperature generator 12 to the condenser 11 therethrough and is capable of detecting the variations in the refrigerant flow rate from the liquid level of the refrigerant in the tank 109. The adjusting means comprises a float valve 181 having an inlet positioned within the refrigerant tank 109 and to be opened or closed according to the liquid level in the tank 109 and an outlet connected to the condenser 11, and an orifice 71 provided in the pipe 7 connecting the refrigerant tank 109 to the condenser 11.

When the flow rate of the refrigerant increases abruptly upon starting up the chiller or in the event of a sudden increase in the load, the liquid level of the refrigerant in the tank 109 rises and consequently opens the float valve 181. As a result, the refrigerant flowing out from the low temperature generator 12 is temporarily collected in the tank 109 and thereafter supplied to the condenser 11 through the float valve 181. At the same time, the refrigerant is supplied from the outlet of the tank 109 to the condenser 11 by way of the orifice 71. In this way, sufficient channel means is provided which extends from the generator 12 to the condenser 11, enabling the refrigerant to flow out from the generator 12 into the condenser 11.

When the chiller is subsequently brought into steady-state operation with the load stabilized, the liquid level of the refrigerant in the tank 109 lowers to close the float valve 181. Consequently, the refrigerant collecting in the tank 109 is supplied to the condenser 11 from the outlet of the tank 109 only through the pipe 7 without passing through the float valve 181. At this time, the pressure of the refrigerant is reduced suitably by the orifice 71 in the pipe 7.

With the second absorption chiller of the invention, the refrigerant supplied from the low temperature generator 12 to the condenser 11 is given a suitably reduced pressure, with the result that each of a high temperature generator 3 and the low temperature generator 12 produces a sufficient amount of vapor in accordance with the quantity of heat input to the generator 3 to realize a higher operation efficiency than in the prior art.

In the case of a third absorption chiller according to the invention, attention is directed to the fact that the ratio of the concentration difference between the strong solution and the intermediate solution to the concentration difference between the weak solution and the intermediate solution can be adjusted effectively by positively controlling the pressure. The chiller resorts to a mode of control for bringing this concentration difference ratio close to 1:1. Thus, a pipe 7 for supplying a refrigerant liquefied in a low temperature generator 12 to a condenser 11 therethrough is provided with pressure control means for controlling the pressure so that the concentration of an intermediate solution becomes equal to the average of the concentration of a strong solution and the concentration of a weak solution.

When the pressure is controlled in this way, each of a high temperature generator 3 and the low temperature generator 12 produces a sufficient amount of vapor in accordance with the quantity of heat input to the generator 3 to realize a higher operation efficiency than in the prior art.

Stated specifically, the pressure control means comprises a control valve 118 mounted on the pipe 7, and a control circuit 119 for controlling the opening degree of the control valve 118.

The control circuit 119 comprises:

a first estimation unit 191 for estimating the concentration Xsm of the absorbent (intermediate solution) in the high temperature generator 3 from the temperature (intermediate solution high temperature) Tsmhg of the absorbent (intermediate solution) in the high temperature generator 3 and measurement data of a physical quantity corresponding to the saturation temperature of the vapor in the high temperature generator 3, a second estimation unit 192 for estimating the concentration Xss of the absorbent (strong solution) in the low temperature generator 12 from the temperature (strong solution high temperature) Tsslg of the absorbent (strong solution) in the low temperature generator 12 and measurement data of a physical quantity corresponding to the saturation temperature of the vapor in the low temperature generator 12, a third estimation unit 193 for estimating the concentration Xsw of the absorbent (weak solution) in the absorber 22 from the temperature (weak solution low temperature) Tswa of the absorbent (weak solution) in the absorber 22 and measurement data of a physical quantity corresponding to the saturation temperature of the vapor in the absorber 22, arithmetic units 194, 195 for calculating a control deviation from the three estimated concentrations, and a controller 190 for controlling the opening degree of the control valve 118 based on the calculated control deviation.

Generally, the temperature T of an absorbent can be represented by an experimental expression containing variables which are the concentration X (%) of the absorbent, and the saturation temperature Trs of water corresponding to a pressure in equilibrium with the concentration and temperature of the absorbent, for example, by the McNeely equation of Mathematical Expression 1.
(Mathematical Expression 1)

$$T = (a_0 + a_1 X + a_2 X^2 + a_3 X^3) T_{rs} + (b_0 + b_1 X + b_2 X^2 + b_3 X^3)$$

where T: the temperature [° C.] of the absorbent

Trs: the saturation temperature [° C.] of water corresponding to a pressure in equilibrium with the concentration and temperature of the absorbent $a_0 = -2.00755$, $a_1 = 0.16976$, $a_2 = -3.13336 \times 10^{-3}$, $a_3 = 1.97668 \times 10^{-5}$ $b_0 = 124.937$, $b_1 = -7.7165$, $b_2 = 0.152286$, $b_3 = 7.9509 \times 10^{-4}$ For example, the concentration Xsm of the absorbent (intermediate solution) in the high temperature generator 3 can be estimated by measuring the temperature of the absorbent and vapor pressure within the high temperature generator 3, calculating the saturation temperature of the vapor in the generator 3 from a relational expression showing the saturation pressure-saturation temperature relationship of water, for example, from the Sugawara equation, i.e., Mathematical Expression 2, based on the measurements, and calculating the concentration from these items of data using the experimental expression, i.e., mathematical Expression 1. The concentration of the absorbent in the low temperature generator 12 and the concentration of the absorbent in the absorber 22 can also be estimated similarly.

The control deviation is calculated from the three estimated concentrations, and the opening degree of the control valve 118 is controlled based on the control deviation, whereby the ratio of the concentration difference between the strong solution and the intermediate solution to the concentration difference between the weak solution and the intermediate solution can be made to approximate 1:1.
(Mathematical Expression 2)

$$\ln \frac{225.65}{P} = [7.21379 + \{1.1520 \times 10^{-5} - (4.787 \times 10^{-9})T_{rs}\}(T_{rs} - 483.16)^2] \times \left(\frac{647.31 - T_{rs}}{T_{rs}}\right)$$

where P: the vapor pressure [kg/cm$^2$]

Trs: the vapor saturation temperature [K]

Incidentally, it is possible for the first estimation unit 191 to use the temperature (low temperature generator refrigerant outlet temperature) Trllg of the refrigerant flowing out from the low temperature generator 12 instead of the saturation temperature of the vapor in the high temperature generator 3, for the second estimation unit 192 to use the temperature (condenser refrigerant outlet temperature) Trlc of the refrigerant flowing out from the condenser 11 instead of the saturation temperature of the vapor in the low temperature generator 12, and for the third estimation unit 193 to use the temperature (evaporator refrigerant recycling temperature) Trle of the refrigerant recycled through an evaporator 21 instead of the saturation temperature of the vapor in the absorber 22. This ensures facilitated temperature measurement to result in a cost reduction.

The third absorption chiller according to the invention achieves a higher efficiency than in the prior art regardless of the refrigeration load.

The present invention provides a fourth absorption chiller which is characterized in that a pipe 272 for supplying an absorbent (intermediate solution) from a high temperature generator 3 to a low temperature generator 12 therethrough is provided with flow rate adjusting means to control the flow rate of the absorbent (intermediate solution) so that the absorbent (strong solution) to be supplied to an absorber 22 is given the highest possible concentration not permitting crystallization of the absorbent. A control valve, pump or the like is usable as the flow rate adjusting means.

With the absorption chiller described above, the flow rate of the absorbent (intermediate solution) to be supplied from the high temperature generator 3 to the low temperature generator 12 is decreased by the operation of the flow rate adjusting means, whereby the absorbent (strong solution) collecting in the low temperature generator 12 can be given an increased concentration. However, if the strong solution is given an excessively high concentration, the absorbent will crystallize, causing trouble to continued operation. According to the present invention, therefore, the flow rate of the absorbent (intermediate solution) is controlled so that the absorbent is given the highest possible concentration not permitting the crystallization of the absorbent. This reduces the recycling rate of the absorbent to diminish the energy to be consumed in raising the sensible heat of the absorbent and achieves an improved operation efficiency.

Stated more specifically, the chiller comprises control means for giving a flow rate command to the flow rate adjusting means, and the control means has stored therein target concentrations of the absorbent at which the absorbent is free of crystallization for varying temperatures of the absorbent and calculates the flow rate command based on the measured temperature of the absorbent (strong solution) to be supplied to the absorber 22 and the measured value or an estimated value of the concentration of the absorbent (strong solution) collecting in the low temperature generator 12.

The concentration at which the absorbent crystallizes varies with the temperature of the absorbent, so that the control means described has stored therein as target values maximum concentrations not permitting crystallization for different temperatures. A particular target concentration of the strong solution is determined based on the measured temperature of the strong solution for operation, such that the intermediate solution is feedback-controlled so as to bring the measured or estimated value of strong solution concentration close to the target concentration. Thus, the absorbent is maintained at the highest possible concentration while remaining free of crystallization despite the load.

Further stated specifically, a pipe 7 for supplying the refrigerant liquefied in the low temperature generator 12 to the condenser 11 therethrough is provided with pressure adjusting means for reducing the pressure of the refrigerant flowing through the pipe and adjusting the pressure reduction, and the pressure reduction is adjusted according to the magnitude of the refrigeration load. Thus, an optimum pressure reduction is determined despite the refrigeration load, with the result that each of the high temperature generator 3 and the low temperature generator 12 produces a sufficient amount of vapor in accordance with the quantity of heat input to the generator 3 to realize a higher operation efficiency than in the prior art.

Stated more specifically, the pressure adjusting means comprises an orifice 71 provided in the pipe 7, a bypass pipe 8 bypassing the orifice 71, and a control valve 81 provided at an intermediate portion of the bypass pipe 8, and the control valve 81 is held fully open during the period from the start-up of the chiller until the load is stabilized and thereafter decreased in its opening degree so as to minimize the quantity of heat input to the high temperature generator 3.

With this specific construction, the pressure reduction of the refrigerant passing through the orifice 71 and the control valve 81 is adjusted by adjusting the opening degree of the control valve 81. When the chiller is to be started up, the control valve 81 is fully opened to send the refrigerant flowing out from the low temperature generator 12 to the condenser 11 without stagnation despite an increased flow rate of the refrigerant.

With the load thereafter stabilized, the opening degree of the control valve 81 is gradually decreased to gradually increase the pressure reduction, leading to an increase in the amount of condensation. If the quantity of heat input to the high temperature generator 3 is controlled to make the cold water outlet temperature approximate the target value at this time, the heat input is to be diminished. However, when the opening degree of the control valve 81 is decreased below a certain value, the flow rate of the refrigerant decreases to conversely increase the quantity of heat input. Accordingly, the control value 81 is set to an opening degree resulting in a minimized quantity of heat input. As a result, an opening degree optimum in the state of stabilized load can be set to achieve a higher efficiency than in the prior art.

With the fourth absorption chiller of the present invention, the strong solution is set at the highest possible concentration at which absorbent remains free of crystallization, hence an improved operation efficiency over the prior art.

BEST MODE OF CARRYING OUT THE INVENTION

Embodiments of the invention will be described below in detail with reference to the drawings.

First Embodiment

Figure 12:
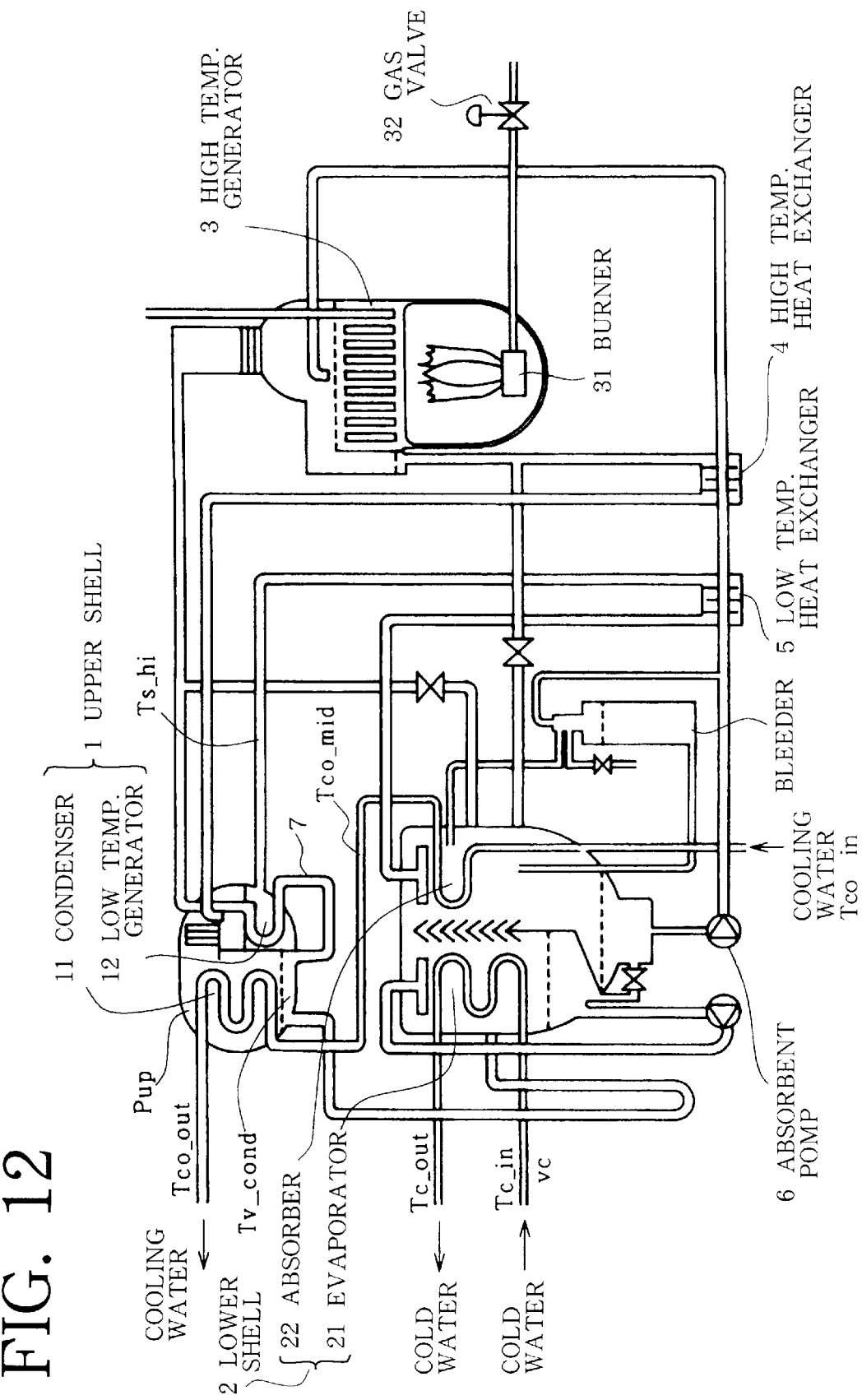
FIG. 12 is a schematic diagram showing the overall construction of a double-effect absorption chiller.
Figure 13:
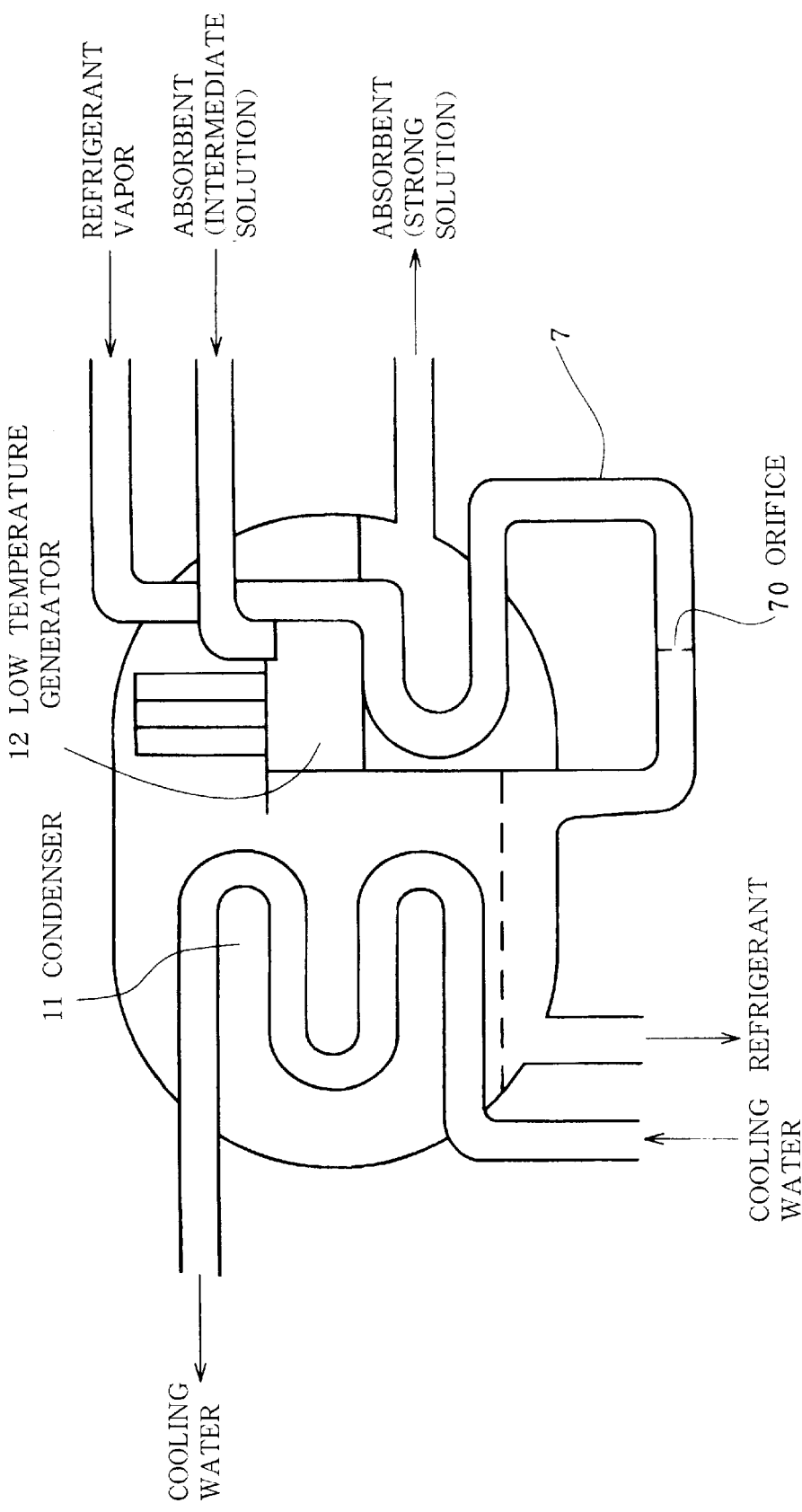
FIG. 13 is a fragmentary schematic diagram showing the construction of a conventional absorption chiller.

Like the conventional absorption chiller shown in FIG. 12, the double-effect absorption chiller of the present embodiment comprises an upper shell 1 comprising a condenser 11 and low temperature generator 12, a lower shell 2 comprising an evaporator 21 and absorber 22, a high temperature generator 3 incorporating a burner 31, a high temperature heat exchanger 4, a low temperature heat exchanger 5, etc. These components are interconnected by piping to recycle an absorbent through the high temperature generator 3, low temperature generator 12 and absorber 22 by an absorbent pump 6 and realize refrigeration cycles.

A gas valve 32 is mounted on a pipe for supplying a fuel gas to the burner 31 of the high temperature generator 3. The opening degree of the gas valve 32 is controlled to adjust the rate of supply of the fuel gas in order to maintain the temperature (cold water outlet temperature Tc_out) of cold water flowing out of the evaporator 21 at a target value.

Figure 1:
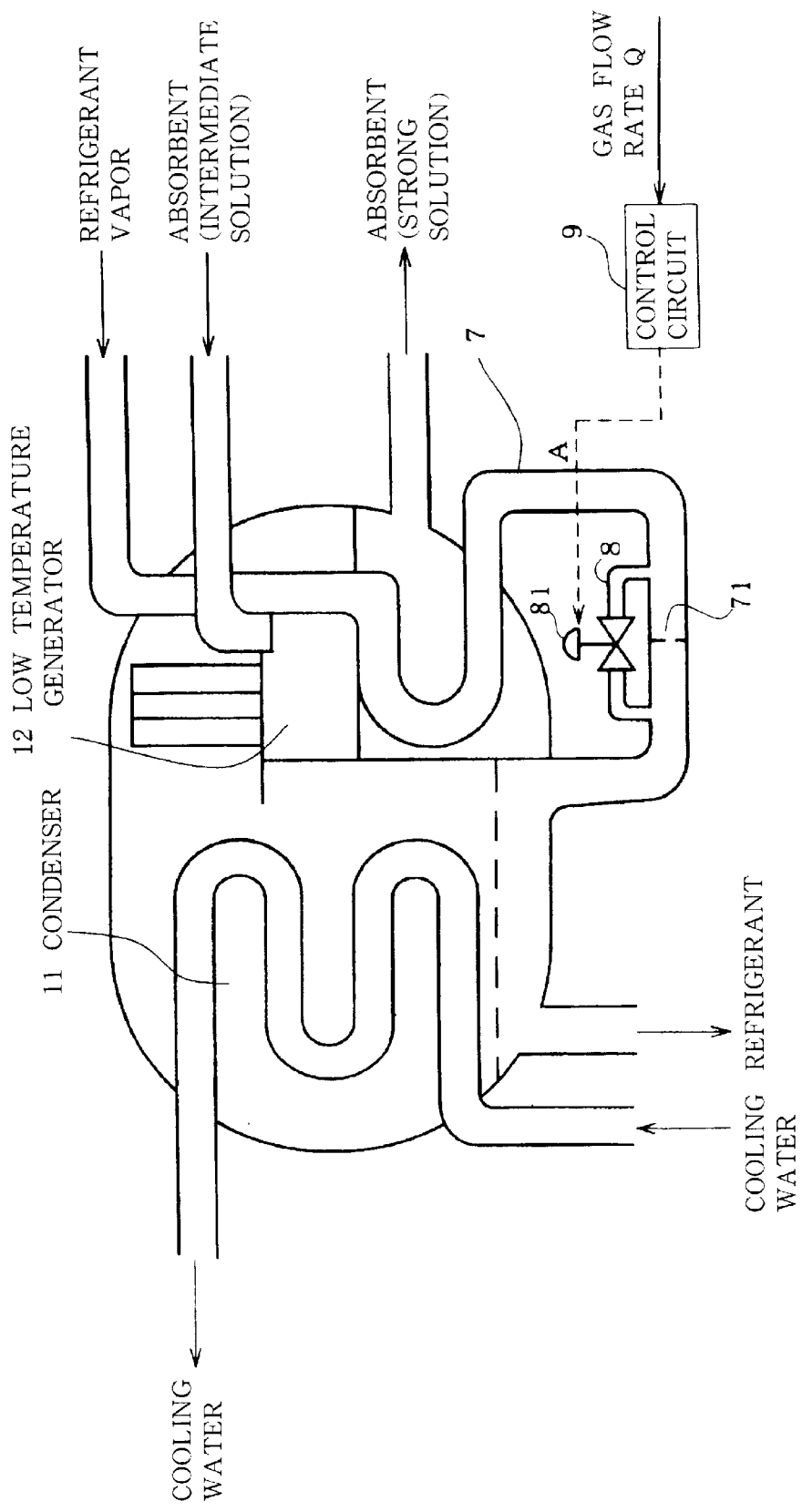
FIG. 1 is a fragmentary schematic diagram showing the construction of a first absorption chiller embodying the invention.

FIG. 1 shows the characteristic construction of the absorption chiller of the present embodiment. A pipe 7 for supplying a refrigerant liquefied in the low temperature generator 12 to the condenser 11 therethrough is provided with an orifice 71 which is smaller than the conventional orifice in diameter. Connected to the pipe 7 is a bypass pipe 8 bypassing the orifice 71, and the bypass pipe 8 has a control valve 81 at an intermediate portion thereof.

A control circuit 9 is connected to the control valve 81. An opening degree command A which varies with the flow rate Q of the fuel gas to be supplied to the high temperature generator 3 is prepared by the control circuit 9 and fed to the control valve 81, whereby the opening degree of the control valve 81 is controlled to an optimum value as will be described later.

Figure 2:
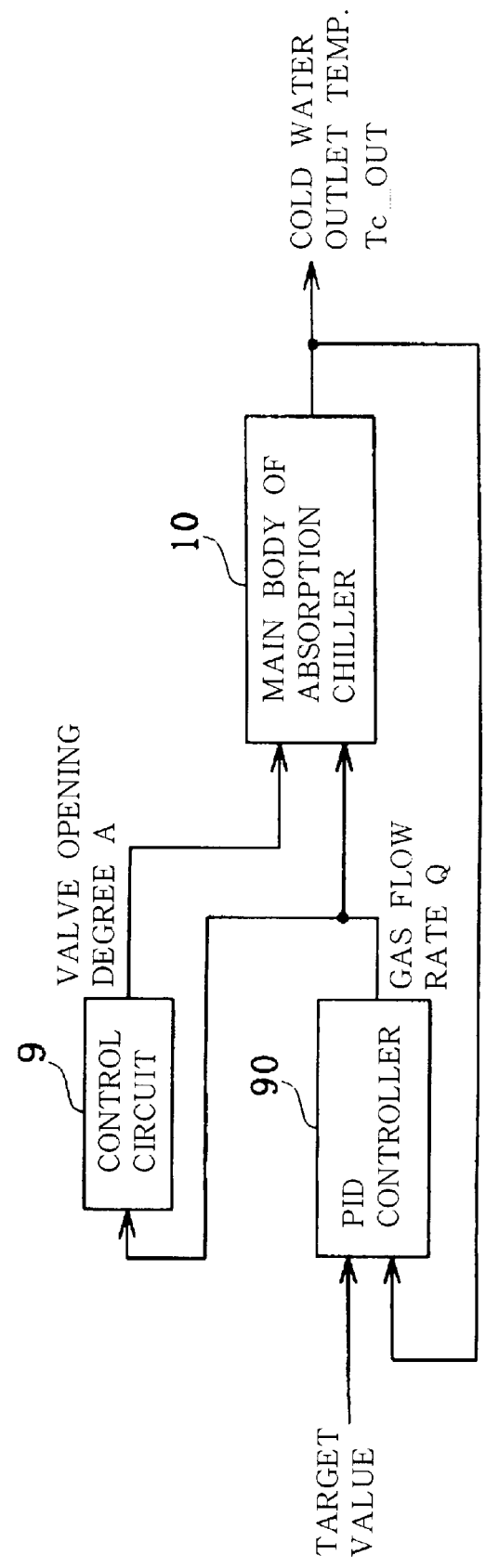
FIG. 2 is a block diagram showing a control system for the absorption chiller.

FIG. 2 shows the construction of a control system for the main body 10 of the absorption chiller.

The cold water outlet temperature Tc_out obtained from the chiller main body 10 and a target value therefor (e.g., 70° C.) are fed to a PID controller 90, which executes PID control to make the temperature Tc_out approximate the target value. The PID controller 90 in turn outputs a command as to the flow rate Q of the fuel gas to be supplied to the high temperature generator.

The command as to the gas flow rate Q is given by the PID controller 90 to the gas valve of the chiller main body 10 to control the opening degree of the valve. The command concerning the gas flow rate Q is also fed from the controller 90 to the control circuit 9, which prepares a valve opening degree command A for the control valve 81 and feeds the command A to the chiller main body 10.

Figure 3:
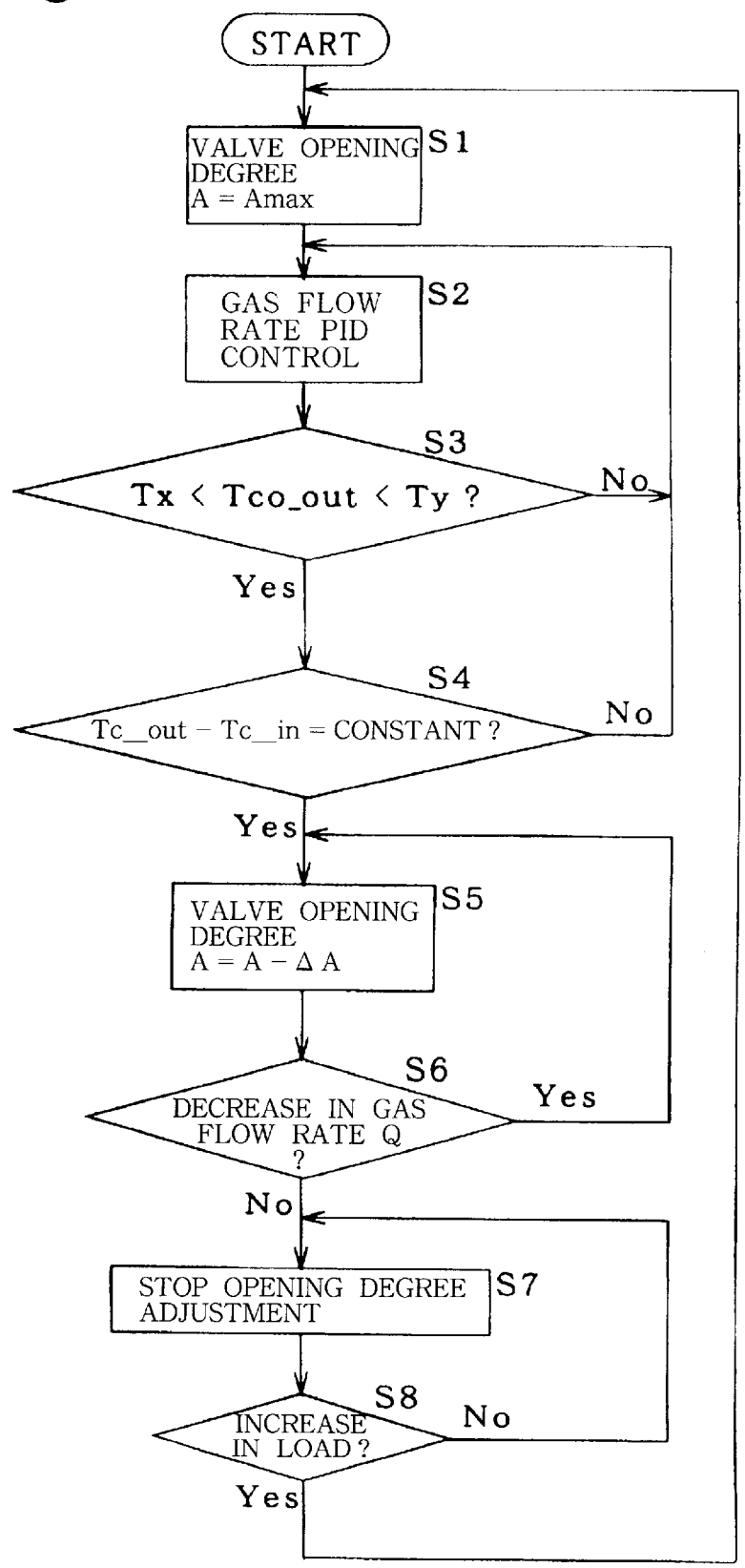
FIG. 3 is a flow chart showing a control procedure for use in the chiller.

FIG. 3 shows the control procedure to be performed by a microcomputer serving as the control system. First, the valve opening degree A is set at a maximum Amax in step S1, and the PID controller 90 PID-controls the gas flow rate Q in step S2. Subsequently, step S3 inquires whether the cold water outlet temperature Tc_out is within a predetermined temperature range Tx–Ty containing the target value to thereby check whether the outlet temperature is in conformity with the target value. If the inquiry is answered in the negative, the PID control of step 2 is continued.

When the inquiry of step S3 is answered in the affirmative, step S4 follows to inquire whether the difference between the cold water outlet temperature Tc_out and the cold water inlet temperature Tc_in is constant to thereby check whether the load is stabilized. If the answer is negative, the sequence returns to step S2 for continued PID control.

When the answer to the inquiry of step S4 is affirmative, step S5 follows to decrease the valve opening degree A by a predetermined amount ΔA. Step S6 thereafter inquires whether the gas flow rate Q is decreased. Since the valve opening degree is excessive immediately after the load has been stabilized, decreasing the opening results in an increased amount of condensation and a reduced gas flow rate, whereas if the valve opening degree becomes smaller than the optimum value in the state of stabilized load, a decreased refrigerant flow rate will result to entail a decreased amount of condensation and an increased gas flow rate.

Accordingly, if the step S6 is answered in the affirmative, step S5 follows again to further decrease the valve opening degree A. When the step S6 is thereafter answered in the negative, the sequence proceeds to step S7 to stop adjusting the valve opening degree.

Finally, step S8 checks the load for an increase, for example, from the cold water outlet-inlet temperature difference. If the load is constant or decreases, step S7 follows again to maintain the current valve opening degree. In the event of an increase in the load, step S1 follows again to set the valve opening degree at the maximum to repeat the foregoing procedure.

According to the control procedure shown in FIG. 3, the control valve 81 is fully opened during the period from the start-up until the load is stabilized, permitting the refrigerant flowing out of the low temperature generator 12 to pass through the control valve 81 and the orifice 71 into the condenser 11 without stagnation. In the subsequent state of stabilized load, the opening degree of the control valve 81 is decreased for an optimum pressure reduction until the gas flow rate changes from decrease to increase. Consequently, an efficiency higher than conventionally is achieved regardless of the load.

Figure 4:
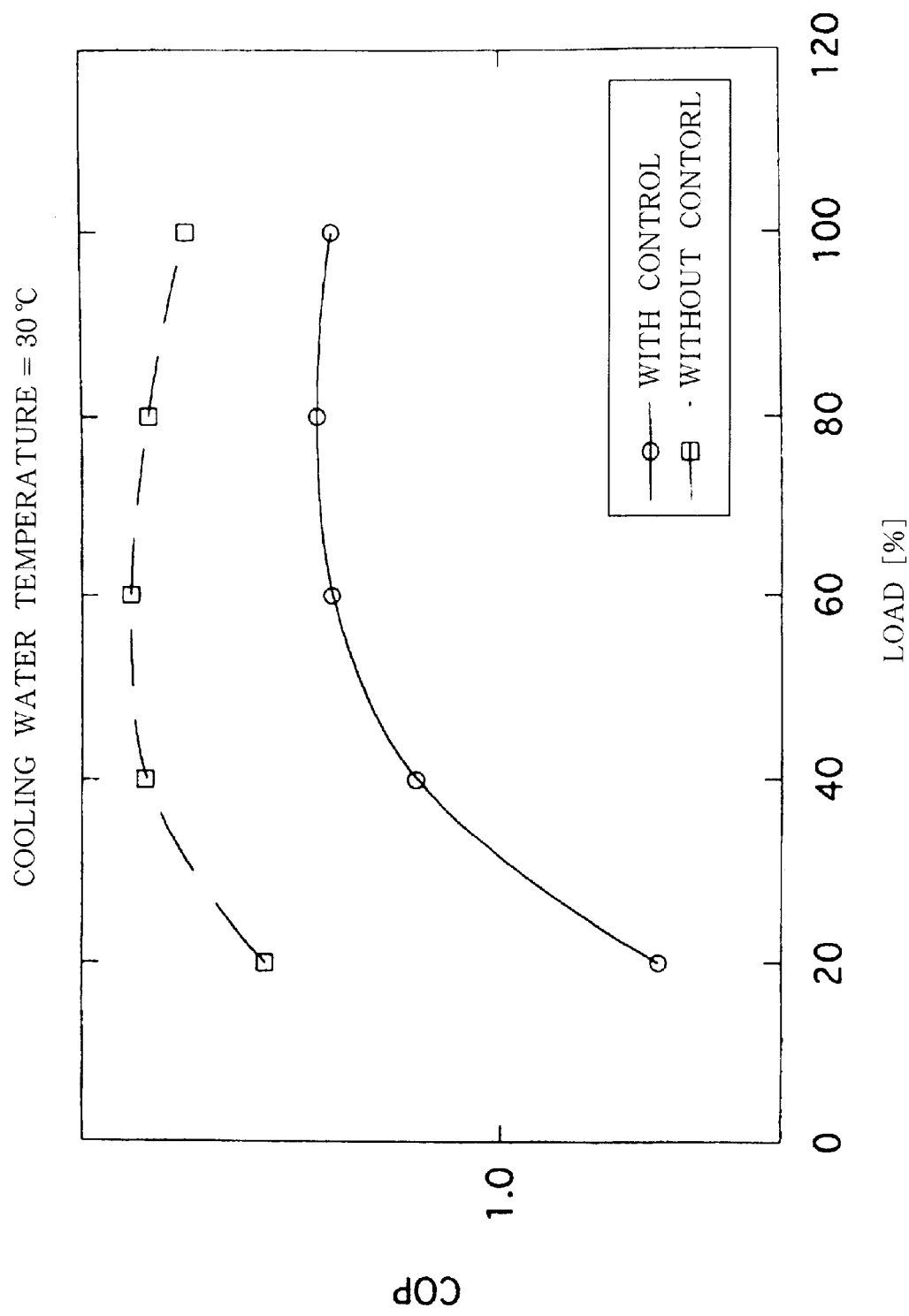
FIG. 4 is a graph showing the relationship between the refrigeration load and the coefficient of performance.

FIG. 4 is a graph showing the relationship between the refrigeration load at a cooling water temperature of 30° C. and the coefficient of performance COP as established by an experiment for the absorption chiller (with control) according to the invention and the conventional absorption chiller (with no control). The graph reveals that the chiller of the invention is greater in coefficient of performance COP regardless of the magnitude of the load.

The opening degree of the control valve 81 is adjustable not only by the procedure shown in FIG. 3 but also by various mode of control wherein the pressure reduction is optimally adjusted according to the magnitude of the refrigeration load. The pipe 7 can be provided with both the orifice 71 and the control valve 81 to eliminate the bypass pipe 8. Further when the pipe 7 is provided with a control valve 81 having a pressure reducing function, the bypass pipe 8 and the orifice 71 can be dispensed with.

Second Embodiment

Figure 5:
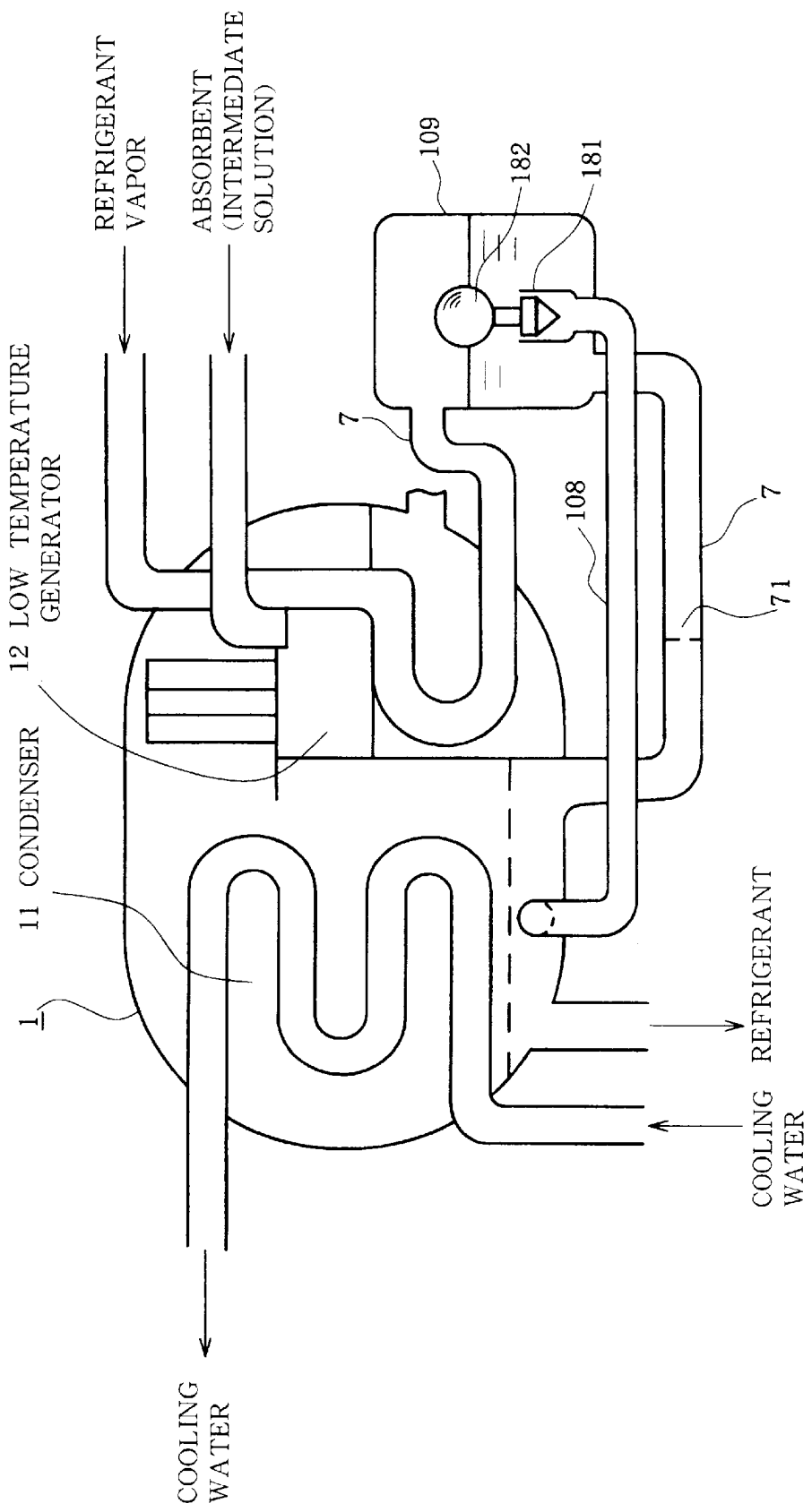
FIG. 5 is a fragmentary schematic diagram showing the construction of a second absorption chiller embodying the invention.

FIG. 5 shows the characteristic construction of absorption chiller of this embodiment. A first pipe 7 for supplying refrigerant as liquefied in a low temperature generator 12 to a condenser 11 therethrough is provided at an intermediate portion thereof with a refrigerant tank 109. The refrigerant tank 109 is provided at an outlet side thereof with an orifice 71 having a diameter and to be given a suitable size when the chiller is in steady-state operation.

Disposed in the refrigerant tank 109 is a float valve 181 which has an inlet opened in the refrigerant within the tank 109 and an outlet connected to an upper shell 1 by a second pipe 108.

On starting up or in the event of a sudden increase in the load, the refrigerant flows out of the low temperature generator 12 at an increased rate, raising the liquid level of the refrigerant in the tank 109 above a predetermined liquid level, whereupon the float valve 181 is opened with the rise of the float 182. When the chiller is thereafter brought into steady-state operation with the load stabilized and with the refrigerant flowing out of the low temperature generator 12 at a constant rate to lower the refrigerant level in the tank 109 below the predetermined liquid level, the valve 181 is closed by the lowered float 182.

Accordingly, the refrigerant flowing into the tank 109 from the generator 12 upon starting up or in the event of an abrupt rise in the load passes through the open float valve 181 and is supplied to the condenser 11 via the second pipe 108 while being supplied to the condenser 11 through the first pipe 7. The two channels thus provided enable the refrigerant flowing out from the low temperature generator 12 to further flow toward the condenser 11 without stagnation.

With the float valve 181 closed during the steady-state operation, the refrigerant flowing out of the generator 12 is unable to pass through the second pipe 108 and is supplied to the condenser 11 only through the first pipe 7. Since the first pipe 7 has the orifice 71 of suitable diameter, the refrigerant is subjected to suitable pressure reduction, consequently permitting each of the high temperature generator 3 and the low temperature generator 12 to produce a sufficient amount of vapor in accordance with the quantity of heat input to the generator 3 to realize a higher operation efficiency than in the prior art.

It is possible to use a sensor for monitoring the liquid level of the refrigerant tank 109 and to provide a control valve on the first pipe 7 so as to adjust the opening degree of the control valve according to the liquid level of the refrigerant tank 109. The second pipe 108 and the float valve 181 can then be dispensed with. The orifice 71 can also be dispensed with when the control valve used is one having a pressure reducing function and flow rate adjusting function.

Third Embodiment

Figure 6:
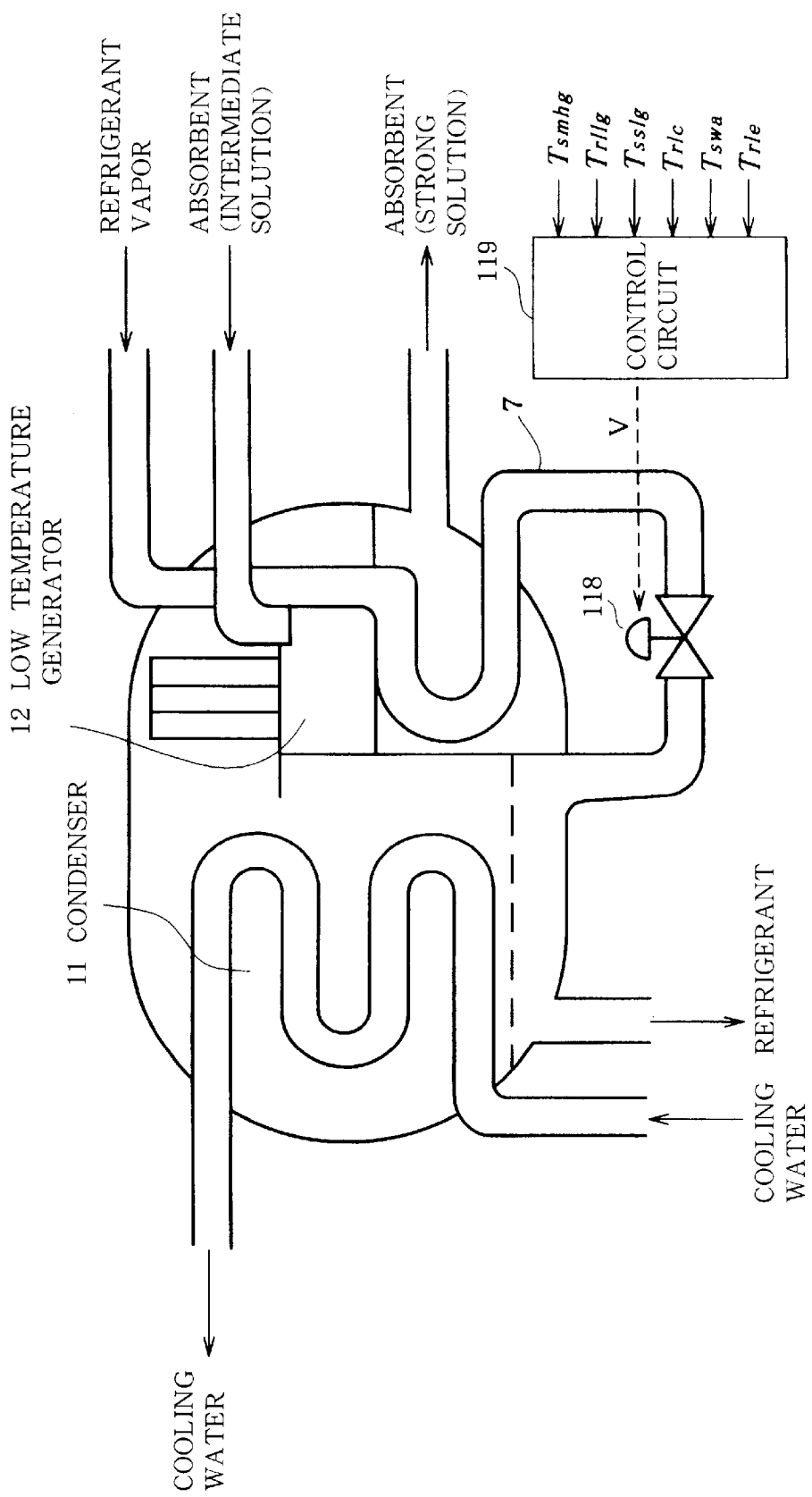
FIG. 6 is a fragmentary schematic diagram showing the construction of a third absorption chiller embodying the invention.

FIG. 6 shows the characteristic construction of absorption chiller of the present embodiment. A pipe 7 for supplying the refrigerant liquefied in a low temperature generator 12 to a condenser 11 therethrough is provided with a control valve 118. A control circuit 119 is connected to the control valve 118. Temperature sensors provided at suitable portions of the main body of the absorption chiller feed intermediate solution high temperature Tsmhg, low temperature generator refrigerant outlet temperature Trllg, strong solution high temperature Tsslg, condenser refrigerant outlet temperature Trlc, weak solution low temperature Tswa and evaporator refrigerant recycling temperature Trle to the control circuit 119, which in turn prepares an opening degree command V from the measurement data for the control valve 118.

Figure 7:
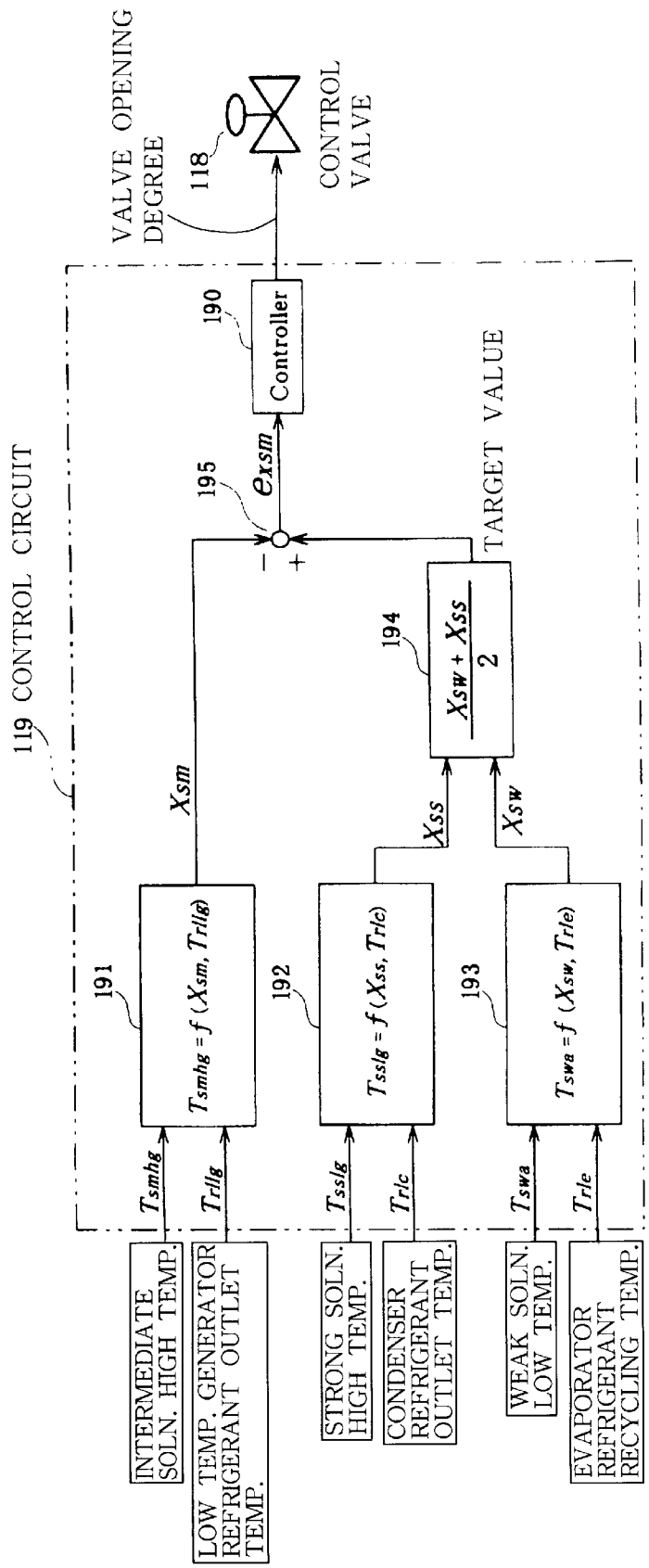
FIG. 7 is a block diagram showing a control system for the absorption chiller.

As shown in FIG. 7, the control circuit 119 comprises a first estimation unit 191, second estimation unit 192, third estimation unit 193, first arithmetic unit 194, second arithmetic unit 195 and PID controller 190.

The first estimation unit 191 estimates the intermediate solution concentration Xsm from the intermediate solution high temperature Tsmhg and low temperature generator refrigerant outlet temperature Trllg using the foregoing McNeely equation. The second estimation unit 192 estimates the strong solution concentration Xss from the strong solution high temperature Tsslg and condenser refrigerant outlet temperature Trlc using the McNeely equation. The third estimation unit 193 estimates the weak solution concentration Xsw from the weak solution low temperature Tswa and evaporator refrigerant recycling temperature Trle using the McNeely equation.

The strong solution concentration Xss and weak solution concentration Xsw estimated by the second and third estimation units 192, 193 are fed to the first arithmetic unit 194 to calculate the average of the two concentrations (Xss+Xsw)/2 for use as a target value. The target value and the intermediate solution concentration Xsm estimated by the first estimation unit 191 are fed to the second arithmetic unit 195 to calculate a control deviation exsm, which is fed to the PID controller 190.

The PID controller 190 executes PID control represented, for example, by Mathematical Expression 3 given below to prepare the opening degree command V for the control valve 118.

(Mathematical Expression 3)

$$V = Kpe_{xsm} + Ki \int e_{xsm} dt + Kd \frac{d}{dt} e_{xsm}$$

where V: the opening degree of the valve

The PID parameters Kp, Ki and Kd in the expression are given suitable values so as to open the control valve 118 when the control deviation exsm is positive or close the control valve 118 when the control deviation exsm is negative.

More specifically, when the control deviation exsm is positive, the intermediate solution concentration is low, so that the control valve 118 is opened to reduce the generator pressure to promote the evaporation of the refrigerant in the high temperature generator and increase the intermediate solution concentration. If the control deviation exsm is negative, on the other hand, the control valve is conversely closed to lower the intermediate solution concentration.

The control this effected brings the ratio of the concentration difference between the strong solution and the intermediate solution to the concentration difference between the weak solution and the intermediate solution close to 1:1, consequently enabling each of the high temperature generator 3 and the low temperature generator 12 to produce a sufficient amount of vapor in accordance with the quantity of heat input to the high temperature generator 3 to achieve a higher operation efficiency than in the prior art.

It is possible to provide the control valve 118 on a bypass pipe bypassing the pipe 7 and to provide an orifice in the pipe 7 as in the prior art to effect a pressure reduction by the orifice and to use the control valve 118 for pressure control at the same time. Further the control valve 118 can be replaced by a pump of the inverter control type.

Fourth Embodiment

Figure 8:
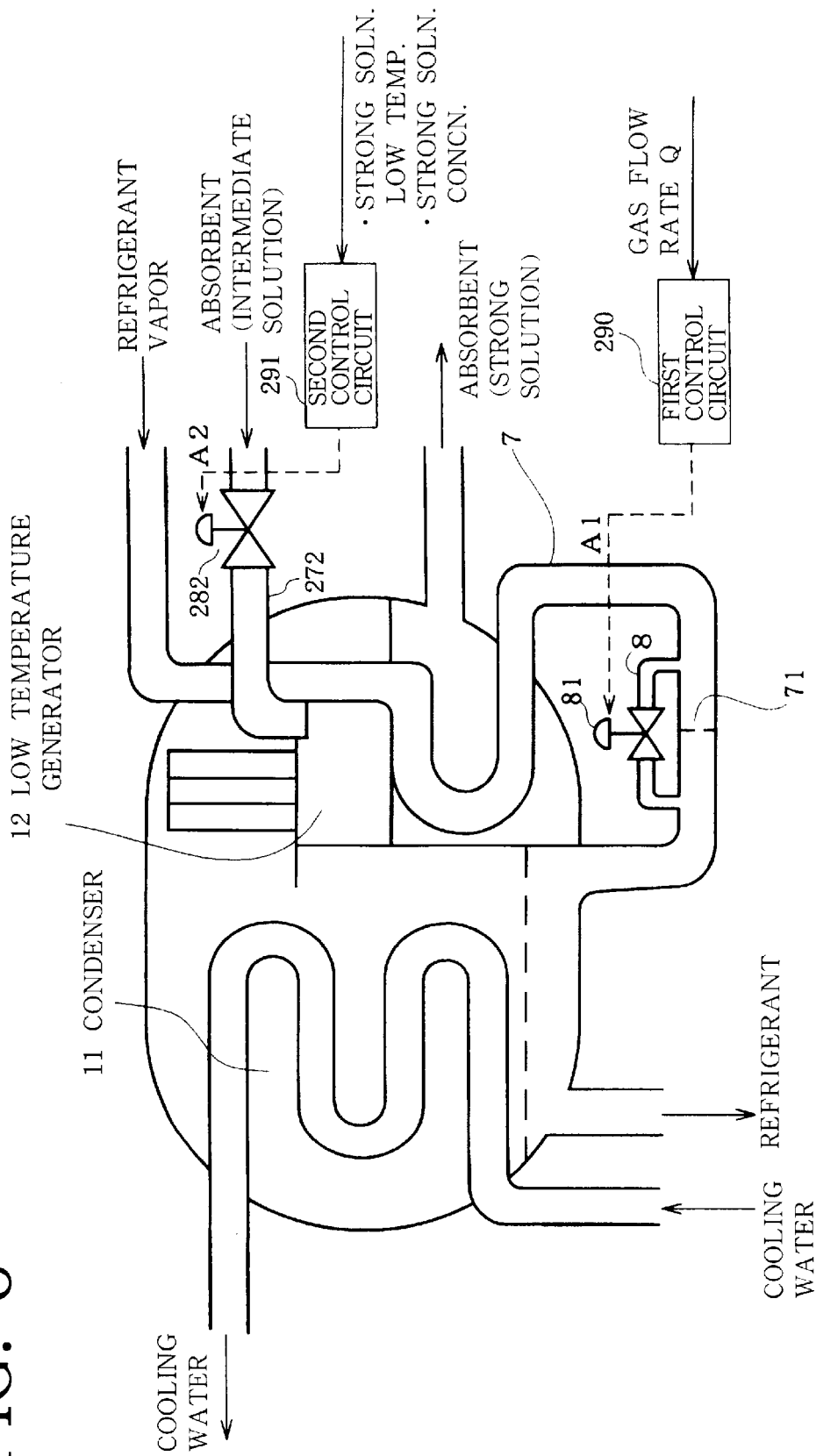
FIG. 8 is a fragmentary schematic diagram showing the construction of a fourth absorption chiller embodying the invention.

FIG. 8 shows the characteristic construction of the absorption chiller of the present embodiment. A pipe 7 for supplying a refrigerant as liquefied in a low temperature generator 12 to a condenser 11 is provided with an orifice 71 which is smaller than the conventional orifice in diameter. Connected to the pipe 7 is a bypass pipe 8 bypassing the orifice 71, and the bypass pipe 8 has a first control valve 81 at an intermediate portion thereof.

A first control circuit 290 is connected to the first control valve 81. An opening degree command A1 which varies with the flow rate Q of the fuel gas to be supplied to a high temperature generator 3 is prepared by the control circuit 290 and fed to the first control valve 81, whereby the opening degree of the control valve 81 is controlled to an optimum value as will be described later. A pipe 272 for supplying an absorber (intermediate solution) from the high temperature generator 3 to the low temperature generator 12 is provided with a second control valve 282 for adjusting the flow rate of the intermediate solution.

A second control circuit 291 is connected to the second control valve 282. Based on the measured value of temperature of the absorbent (strong solution) sprinkled in an absorber 22 and the measurement, or an estimated value, of concentration of the absorbent (strong solution) collecting in the low temperature generator 12, the circuit 291 prepares an opening degree command A2 for obtaining a maximum strong solution concentration at which the absorbent remains free of crystallization and feeds the command A2 to the second control valve 282.

Figure 9:
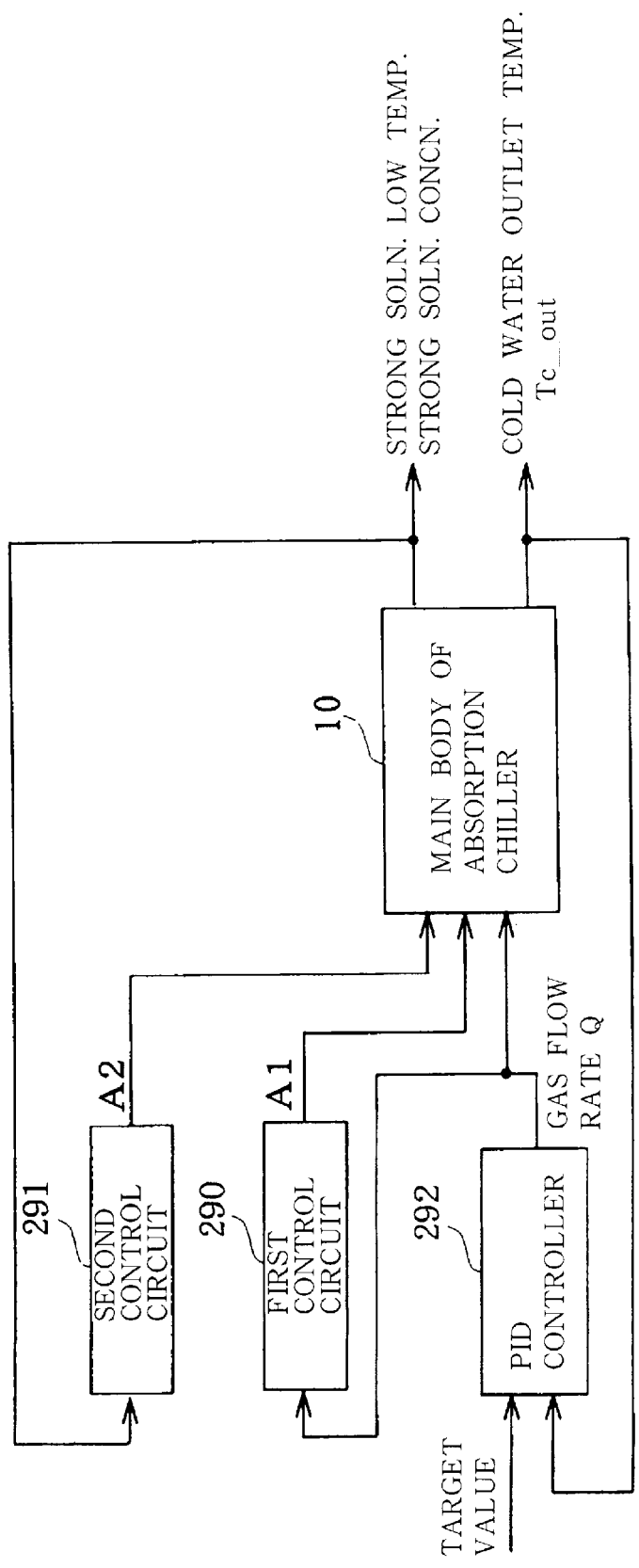
FIG. 9 is a block diagram showing a control system for the absorption chiller.

FIG. 9 shows the construction of a control system for the main body 10 of the absorption chiller. The cold water outlet temperature Tc_out obtained from the chiller main body 10 and a target value therefor (e.g., 7° C.) are fed to a PID controller 292, which executes PID control to make the temperature Tc_out approximate the target value. The PID controller 292 in turn outputs a command as to the flow rate Q of the fuel gas to be supplied to the high temperature generator.

The command as to the gas flow rate Q is given by the PID controller 292 to the gas valve of the chiller main body 10 to control the opening degree of the valve. The command concerning the gas flow rate Q is also fed from the controller 292 to the first control circuit 290, which prepares a valve opening degree command A1 for the first control valve 81 and feeds the command A1 to the chiller main body 10. Further the strong solution low temperature measured at the outlet of a low temperature heat exchanger 5 of the chiller main body 10 and the strong solution concentration measured or estimated as will be described later are fed to the second control circuit 291, which prepares an opening degree command A2 for obtaining a maximum strong solution concentration at which the absorbent will not crystallizes and feeds the command A2 to the chiller body 10.

Figure 10:
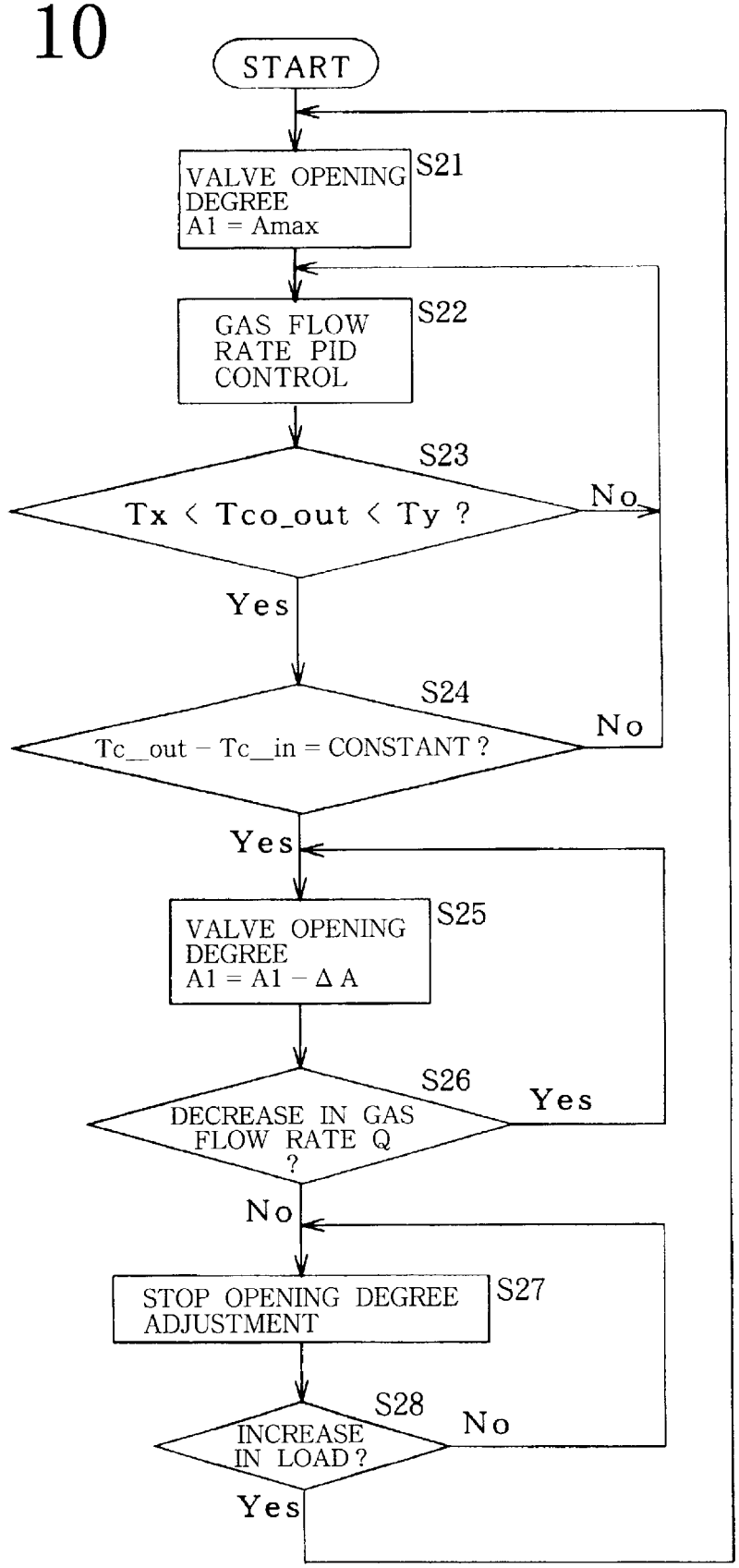
FIG. 10 is a flow chart showing a procedure for controlling the reduction of pressure for use in the chiller.
Figure 11:
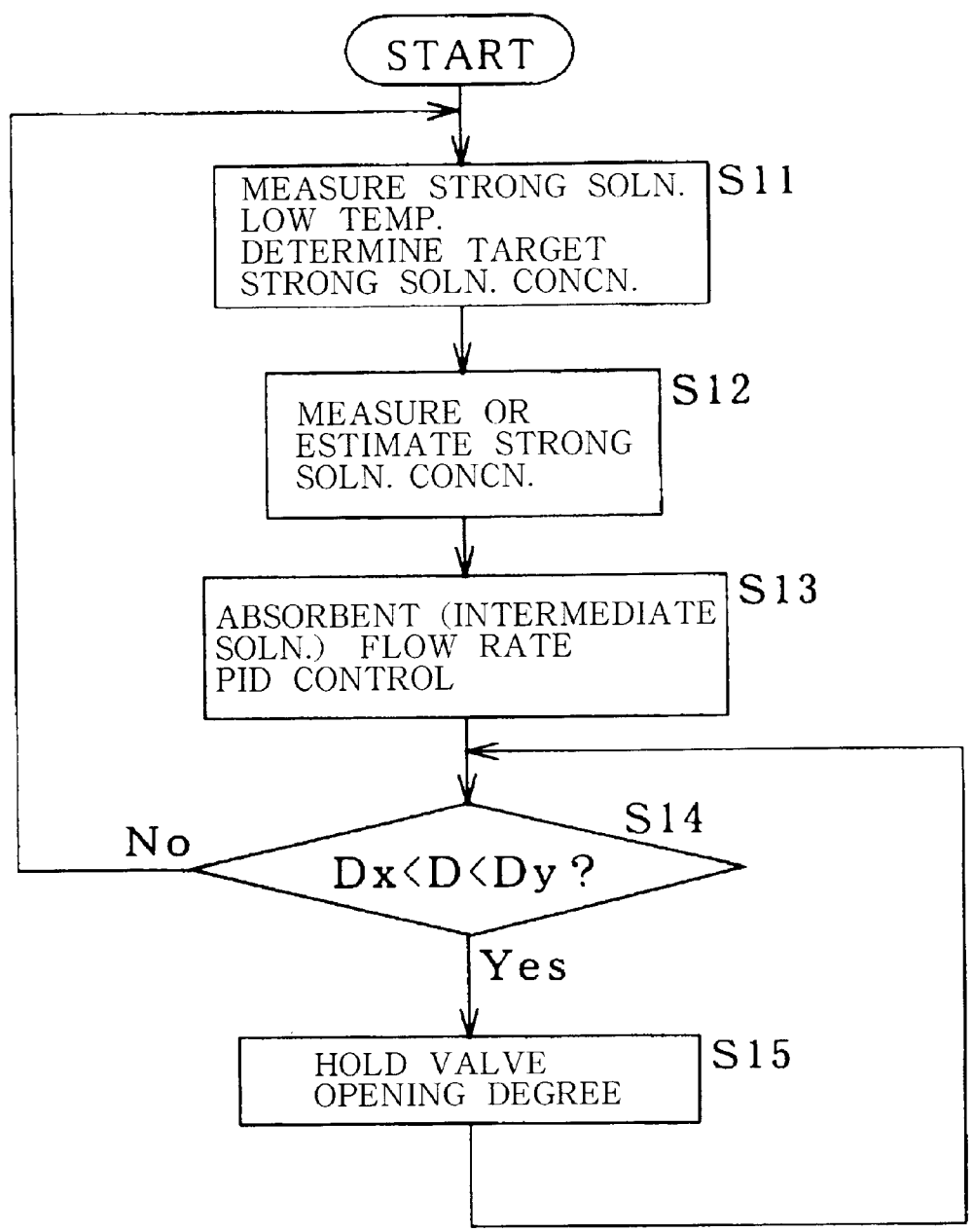
FIG. 11 is a flow chart showing a procedure for controlling the concentration of a strong solution for use in the chiller.

FIGS. 10 and 11 show the control procedures to be performed by a microcomputer serving as the control system comprising the first and second control circuits 290 and 291 for the respective procedures. These two control procedures are executed at the same time in specified control cycles.

According to the control procedure shown in FIG. 10, the valve opening degree A1 of the first control valve 81 is set at a maximum Amax first in step S21, and the PID controller 292 PID-controls the gas flow rate Q in step S22.

Subsequently, step S23 inquires whether the cold water outlet temperature Tc_out is within a predetermined temperature range Tx–Ty containing the target value to thereby check whether the outlet temperature is in conformity with the target value. If the inquiry is answered in the negative, the PID control of step 22 is continued.

When the inquiry of step S23 is answered in the affirmative, step S24 follows to inquire whether the difference between the cold water outlet temperature Tc_out and cold water inlet temperature Tc_in is constant to thereby check whether the load is stabilized. If the answer is negative, the sequence returns to step S22 for continued PID control.

When the answer to the inquiry of step S24 is affirmative, step S25 follows to decrease the valve opening degree A1 by a predetermined amount ΔA. Step S26 thereafter inquires whether the gas flow rate Q is decreased. Since the valve opening degree is excessive immediately after the load has been stabilized, decreasing the opening results in an increased amount of condensation and a reduced gas flow rate, whereas if the valve opening degree becomes smaller than the optimum value in the state of stabilized load, a decreased refrigerant flow rate will result to entail a decreased amount of condensation and an increased gas flow rate. Accordingly, if the step S26 is answered in the affirmative, step S25 follows again to further decrease the valve opening degree A1.

When the step S26 is thereafter answered in the negative, the sequence proceeds to step S27 to stop adjusting the valve opening degree. Finally, step S28 checks the load for an increase, for example, from the cold water outlet-inlet temperature difference. If the load is constant or decreases, step S27 follows again to maintain the current valve opening degree. In the event of an increase in the load, step S21 follows again to set the valve opening degree at the maximum to repeat the foregoing procedure.

According to the control procedure shown in FIG. 10, the control valve 81 is fully opened during the period from the start-up until the load is stabilized, permitting the refrigerant flowing out of the low temperature generator 12 to pass through the control valve 81 and the orifice 71 into the condenser 11 without stagnation. In the subsequent state of stabilized load, the opening degree of the control valve 81 is decreased for an optimum pressure reduction until the gas flow rate changes from decrease to increase. Consequently, an efficiency higher than conventionally is achieved regardless of the load.

According to the control procedure shown in FIG. 11, on the other hand, the strong solution low temperature is measured and a target strong solution concentration is determined first in step S11. For such target concentrations, maximum strong solution concentrations are predetermined for different temperatures of the absorbent, within a range in which the absorbent is free of crystallization, and stored in a memory in the form of a table or mathematical expression. For operation, a target strong solution concentration is derived based on measurement data as to the strong solution low temperature. The target strong solution concentration can be determined as a value smaller by a predetermined value (e.g., 0.5%) than a concentration at which the absorbent crystallizes.

The strong solution concentration is measured or estimated next in step S12. This concentration can be measured by a known concentration sensor attached to the low temperature generator 12. The strong solution concentration can be estimated, for example, with use of Mathematical Expression 1. Incidentally, the absorbent temperature (strong solution temperature) T can be measured by a temperature sensor attached to the low temperature generator 12. The saturation temperature Trs is obtained by measuring the temperature of the refrigerant collecting in the condenser 11 with a temperature sensor attached thereto. The saturation temperature Trs can alternatively be obtained by measuring the pressure with a pressure sensor attached to the upper shell 1 and deriving a value from the relationship between the pressure and the temperature with reference to a saturation vapor table. An estimated value of strong solution concentration D (X in Mathematical Expression 1) can be obtained by substituting the strong solution concentration and the saturated temperature thus obtained in Mathematical Expression 1 and solving Expression 1.

The opening degree of the second control valve 282, i.e., the flow rate of the absorbent (intermediate solution), is PID-controlled next in step S13 of FIG. 11 so as to bring the deviation of the measured or estimated strong solution concentration from the target concentration close to zero. Step S14 inquires whether the measured or estimated strong solution concentration D is within a predetermined range Dx–Dy containing the target value to thereby check whether the concentration is conformity with the target value. If the inquiry is answered in the negative, step S11 follows again to repeat the PID control of the intermediate solution flow rate. When the inquiry of step S14 is answered in the affirmative, the sequence proceeds to step S15 to hold the first control valve 81 at the current opening degree, followed by step S14 again.

The control procedure described above controls the flow rate of the absorbent (intermediate solution) so as to give the absorbent (strong solution) the highest possible concentration not permitting the crystallization of the absorbent. This achieves a higher operation efficiency than conventionally.

The control shown in FIG. 10 for the pressure reduction of the refrigerant is effected simultaneously with the execution of the control shown in FIG. 11 for the strong solution concentration, with the result that a target strong solution concentration is determined and the concentration control is effected to follow the target value, while the chiller is held in operation most efficiently with respect to the production of vapor in the high temperature generator 3 and the condenser 11. Accordingly, a greater improvement is achieved in operation efficiency than when no control is executed for the strong solution concentration.

A pump of the inverter control type is also usable in place of the second control valve 282 shown in FIG. 8.

What is claimed is:

1. A double-effect absorption chiller wherein the vapor of a refrigerant produced by a high temperature generator is supplied to a low temperature generator for condensation, and the refrigerant liquefied by condensation is supplied to a condenser, the absorption chiller being characterized in that a pipe for supplying the refrigerant liquefied in the low temperature generator to the condenser therethrough is provided with pressure adjusting means for reducing the pressure of the refrigerant flowing through the pipe and adjusting the pressure reduction, the pressure adjusting means comprising an orifice provided in the pipe, a bypass pipe bypassing the orifice, and a control valve provided at an intermediate portion of the bypass pipe, a control circuit being connected to the control valve for controlling the opening degree of the control valve in accordance with the magnitude of refrigeration load.

2. An absorption chiller according to claim 1 wherein the quantity of heat input to the high temperature generator is controlled so as to bring a cold water outlet temperature close to a target value, and the control circuit controls the control valve to hold the valve fully open during the period from the start-up of the chiller until the load is stabilized and thereafter gradually decrease the opening degree of the control valve insofar as the quantity of heat input to the high temperature generator decreases.

3. A double-effect absorption chiller wherein the vapor of a refrigerant produced by a high temperature generator is supplied to a low temperature generator for condensation, and the refrigerant liquefied by condensation is supplied to a condenser, the absorption chiller being characterized in that a fluid channel for supplying the refrigerant liquefied in the low temperature generator to the condenser therethrough is provided with sensor means for detecting variations in the flow rate of the refrigerant flowing out from the low temperature generator, and adjusting means for adjusting the flow rate of the refrigerant to be sent to the condenser and giving a suitable reduced pressure to the refrigerant, the adjusting means being operable to increase the flow rate of the refrigerant upon the sensor means detecting an increased flow rate.

4. An absorption chiller according to claim 3 wherein the sensor means has a refrigerant tank at an intermediate portion of a pipe for supplying the refrigerant liquefied in the low temperature generator to the condenser therethrough and detects the variations in the refrigerant flow rate from the liquid level of the refrigerant in the tank.

5. An absorption chiller according to claim 4 wherein the adjusting means comprises a float valve having an inlet positioned within the refrigerant tank and to be opened or closed according to the liquid level in the tank and an outlet connected to the condenser, and an orifice provided in the pipe connecting the refrigerant tank to the condenser.

6. A double-effect absorption chiller wherein the vapor of a refrigerant produced by a high temperature generator is supplied to a low temperature generator for condensation, the refrigerant liquefied by condensation is supplied to a condenser, and an absorbent is recycled through the high temperature generator, the low temperature generator and an absorber, the absorption chiller being characterized in that a pipe for supplying the refrigerant liquefied in the low temperature generator to the condenser therethrough is provided with pressure control means for controlling the pressure so that the concentration of the absorbent in the high temperature generator becomes equal to the average of the concentration of the absorbent in the low temperature generator and the concentration of the absorbent in the absorber.

7. An absorption chiller according to claim 6 wherein the pressure control means comprises a control valve mounted on the pipe, and a control circuit for controlling the opening degree of the control valve, the control circuit comprising:

a first estimation unit for estimating the concentration Xsm of the absorbent in the high temperature generator from the temperature Tsmhg of the absorbent in the high temperature generator and measurement data of a physical quantity corresponding to the saturation temperature of the vapor in the high temperature generator, a second estimation unit for estimating the concentration Xss of the absorbent in the low temperature generator from the temperature Tsslg of the absorbent in the low temperature generator and measurement data of a physical quantity corresponding to the saturation temperature of the vapor in the low temperature generator, a third estimation unit for estimating the concentration Xsw of the absorbent in the absorber from the temperature Tswa of the absorbent in the absorber and measurement data of a physical quantity corresponding to the saturation temperature of the vapor in the absorber, arithmetic units for calculating a control deviation from the three estimated concentrations, and a controller for controlling the opening degree of the control valve based on the calculated control deviation.

8. An absorption chiller according to claim 7 wherein the first estimation unit uses the temperature Trllg of the refrigerant flowing out from the low temperature generator instead of the saturation temperature of the vapor in the high temperature generator, the second estimation unit uses the temperature Trlc of the refrigerant flowing out from the condenser instead of the saturation temperature of the vapor in the low temperature generator, and the third estimation unit uses the temperature Trle of the refrigerant recycled through an evaporator instead of the saturation temperature of the vapor in the absorber.

9. An absorption chiller according to claim 7 wherein in estimating the saturation temperature of the vapor in the high temperature generator, the saturation temperature of the vapor in the low temperature generator and the saturation temperature of the vapor in the absorber respectively by the first estimation unit, the second estimation unit and the third estimation unit, the units and measure the pressures of the respective vapors and calculate the respective saturation temperatures from a relational expression as to the saturation pressure-saturation temperature relationship of water based on the measurement data.

10. A double-effect absorption chiller wherein the vapor of a refrigerant released from an absorbent in a high temperature generator is supplied to a low temperature generator for condensation, the refrigerant liquefied by condensation is supplied to a condenser, and the absorbent in the high temperature generator is supplied to the low temperature generator and heated with the heat of condensation of the refrigerant vapor, the absorption chiller being characterized in that a pipe for supplying the absorbent from the high temperature generator to the low temperature generator therethrough is provided with flow rate adjusting means to control the flow rate of the absorbent so that the absorbent to be supplied to an absorber is given the highest possible concentration not permitting crystallization of the absorbent.

11. An absorption chiller according to claim 10 which comprises control means for giving a flow rate command to the flow rate adjusting means, and the control means has stored therein target concentrations of the absorbent at which the absorbent is free of crystallization for varying temperatures of the absorbent and calculates the flow rate command based on the measured temperature of the absorbent to be supplied to the absorber and the measured value or an estimated value of the concentration of the absorbent collecting in the low temperature generator.

12. An absorption chiller according to claim 10 wherein the flow rate adjusting means comprises a control valve or a pump provided on the pipe.

13. An absorption chiller according to claim 10 wherein a pipe for supplying the refrigerant liquefied in the low temperature generator to the condenser therethrough is provided with pressure adjusting means for reducing the pressure of the refrigerant flowing through the pipe and adjusting the pressure reduction, and the pressure reduction is adjusted according to the magnitude of the refrigeration load.

14. An absorption chiller according to claim 13 wherein the pressure adjusting means comprises an orifice provided in the pipe, a bypass pipe bypassing the orifice, and a control valve provided at an intermediate portion of the bypass pipe, and the control valve is held fully open during the period from the start-up of the chiller until the load is stabilized and thereafter decreased in its opening degree so as to minimize the quantity of heat input to the high temperature generator.

* * * * *